(12) United States Patent
Mackey et al.

(10) Patent No.: US 7,823,440 B2
(45) Date of Patent: Nov. 2, 2010

(54) SYSTEMS AND METHODS FOR CHARACTERIZING THICKNESS AND TOPOGRAPHY OF MICROELECTRONIC WORKPIECE LAYERS

(75) Inventors: Jeffrey L. Mackey, Boise, ID (US); Gurtej S. Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 589 days.

(21) Appl. No.: 11/839,688

(22) Filed: Aug. 16, 2007

(65) Prior Publication Data
US 2009/0044610 A1 Feb. 19, 2009

(51) Int. Cl.
*B23Q 17/09* (2006.01)
(52) U.S. Cl. ...................................... 73/104; 73/150 R
(58) Field of Classification Search ........................ None
See application file for complete search history.

(56) References Cited

U.S. PATENT DOCUMENTS

| | | | |
|---|---|---|---|
| 5,757,502 A | 5/1998 | Weling | |
| 6,999,180 B1* | 2/2006 | Janik et al. | 356/503 |
| 7,403,323 B2* | 7/2008 | Cummings et al. | 359/291 |
| 2003/0197874 A1* | 10/2003 | Moghaddam et al. | 356/630 |

* cited by examiner

*Primary Examiner*—Robert R Raevis
(74) *Attorney, Agent, or Firm*—Perkins Coie LLP (57) ABSTRACT

Metrology systems, tools, and methods that characterize one or more layers of a microelectronic workpiece are disclosed herein. In one embodiment, a system for characterizing thickness and topography of a workpiece layer includes a layer thickness instrument configured to measure a thickness of a first workpiece layer at individual sampling sites, a surface topography instrument configured to measure a relative surface height of the first layer at the individual sampling sites, and a processing unit communicatively coupled to receive thickness and topography measurements and operable to output layer data that includes individual thickness measurements combined with individual topography measurements at workpiece coordinates corresponding to the individual sampling sites. In another embodiment, the system further includes an output device communicatively coupled with the processing unit and operable to graphically display a stratigraphic cross-section corresponding to the output layer data.

26 Claims, 6 Drawing Sheets

SYSTEMS AND METHODS FOR CHARACTERIZING THICKNESS AND TOPOGRAPHY OF MICROELECTRONIC WORKPIECE LAYERS

TECHNICAL FIELD

The present disclosure is related to metrology systems, tools, and methods that characterize one or more layers of a microelectronic workpiece.

BACKGROUND

Microelectronic devices typically comprise several dielectric, conductive, and semi-conductive layers. The operating characteristics of microelectronic devices are defined, at least in part, by the various layers in a device. A field effect transistor, for example, includes a doped silicon channel region under a layer of silicon dioxide, and the configuration of these layers can influence the performance as follows: arranging the channel region directly below the oxide layer mitigates parasitic capacitances; patterning the channel region across a width-wide axis of the oxide layer limits a maximum amount of channel current; and thinning the oxide layer decreases transistor turn-on voltage.

Variations in the properties of the individual layers will likewise create deviations in device performance. To ensure that a device has desired operating characteristics, microelectronic device fabrication requires stringent monitoring of the layers before, during, and/or after the processing steps. Such monitoring identifies layers with substandard properties and allows deviations in process steps to be quickly detected and corrected.

To accurately monitor device wafers, most fabrication facilities have a variety of metrology tools that are dedicated to inspecting key properties of the layers and/or features on a wafer. For example, particle counters reveal how many particulates have been deposited or otherwise formed on a layer; four-point probes measure the resistance of doped silicon and deposited metal layers; and inline scanning electron microscopes (SEMs) facilitate inspection of submicron layer geometries.

One property that is closely monitored is layer thickness. To monitor layer thickness, most facilities include an ellipsometer in their repertoire of metrology tools. An ellipsometer detects layer thickness by reflecting polarized light off of a surface of the wafer and analyzing the incident light. In addition to layer thickness, ellipsometers also provide information about layer uniformity and output relative thicknesses on a wafer map. Because ellipsometers employ a light beam, the detection is non-contact and non-destructive. In addition to being non-contact, ellipsometry is generally highly automated. Typically, an ellipsometer includes a user-programmed wafer map, which guides the ellipsometer to specific detection points on the wafer. Thus ellipsometers are also generally high throughput tools.

As device geometries become smaller, ellipsometry tools need to be able to measure smaller layer thicknesses. A well calibrated ellipsometer, for example, can detect thickness variations in the gate oxide of newer generation field effect transistors having thicknesses on the order of tens of angstroms. Furthermore, in smaller device geometries, the layer topography can also provide useful information for assessing the properties of a layer or other structure. For example, in older generation transistors having thick metal interconnects, small topography variations in the underlying isolation oxide may not translate into a significant metal-line surface height variation. However, as metal lines become thinner, small topography variations in the underlying oxide can produce sizable metal-line surface height variations. These topography variations can cause incomplete metal coverage, increased interconnect resistance, or localized electrical fields, all of which may ultimately result in interconnect failure.

DETAILED DESCRIPTION

Various embodiments of metrology tools and methods of using such tools for characterizing a layer of a microelectronic workpiece are described below. The terms "tool" and "instrument" may encompass various types of metrology equipment having electrical, mechanical, and optical components that are arranged to measure and characterize specific properties of one or more workpiece layers. The term "workpiece" may encompass a variety of articles of manufacture, including elemental and compound semiconductor substrates; dielectric substrates; and metallic substrates; and one or more layers of conductive, non-conductive, and semi-conductive materials formed thereon. The term "layer" encompasses a film or homogenous strata of conductive, non-conductive, or semi-conductive material and may further include alloyed or graded junctions between adjacent workpiece layers. Other embodiments for measuring specific workpiece layers in addition to or in lieu of the embodiments descried in this section may have several additional features or may not include many of the features shown and described below with reference to FIGS. 1A-8.

Figure 1A:
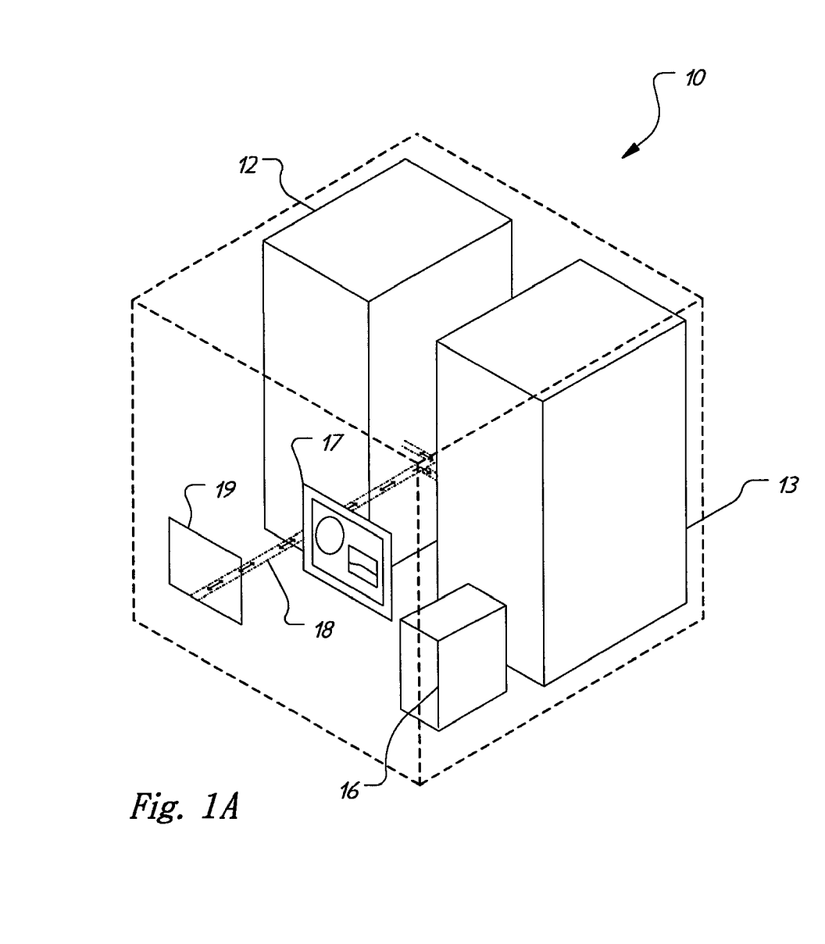
FIG. 1A is an isometric view of a metrology tool configured in accordance with one embodiment of the disclosure.

FIG. 1A is an isometric view of one embodiment of a system for producing data that characterizes one or more layers of a microelectronic workpiece. In this embodiment, the system comprises a metrology tool 10 including a layer thickness instrument 12, a surface topography instrument 13, an input/output (I/O) device 17 (e.g., a keyboard, a display, a touch-screen, a printer, or combinations thereof), and a processing unit 16 coupled to the thickness and topography instruments 12-13 and the I/O device 17. The metrology tool 10 can further include a workpiece transport system 18 configured to receive a workpiece at an opening 19 of the metrology tool 10 and to transport the workpiece between the opening 19, the thickness instrument 12, and/or the topography instrument 13. Although not shown in FIG. 1A, the transport system 18 can further include a loading station for receiving a cassette of workpieces as well as various robotic instruments for handling the workpieces internally within the metrology tool 10. In one embodiment, the metrology tool 10 is operated according to a method that includes: the transport system 18 receiving a workpiece at the opening 19; the transport system 18 loading the workpiece into the thickness instrument 12; the thickness instrument 12 measuring thicknesses of a top layer of the workpiece at individual sampling sites and transmitting the thickness measurements to the processing unit 16; the transport system 18 loading the workpiece into the topography instrument 13; the topography instrument 13 measuring relative surface heights of the top layer at the individual sampling sites and transmitting the surface height measurements to the processing unit 16; and the processing unit 16 producing and outputting layer data to the I/O device 17.

Figure 1B:
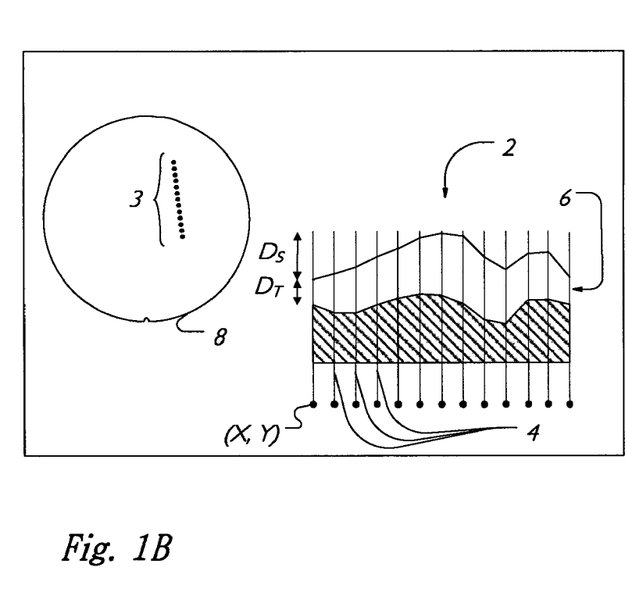
FIG. 1B is block diagram showing an embodiment of layer data produced by the metrology tool of FIG. 1A.

The layer data output by the processing unit 16 includes individual thickness measurements combined with individual surface height measurements at workpiece coordinates corresponding to individual sampling sites. FIG. 1B is a block diagram showing an embodiment of the layer data, which can be graphically displayed at the I/O device 17, and includes a wafer map 8 corresponding to a microelectronic workpiece and a stratigraphic cross-section 2 through a portion of the workpiece. The wafer map 8 shows the locations of individual sampling sites 3 that have been measured by the metrology tool 10. The stratigraphic cross-section 2 shows a layer strata 6 that has been assembled from individual datums 4 of measured layer thickness $D_T$, measured layer surface height $D_S$, and workpiece coordinates (X, Y) corresponding to individual sampling sites 3. In other embodiments the layer data can be collected across larger or smaller portions of the workpiece or within individual die portions of the workpiece. In addition, the datums 4 may be used to assemble a variety of displayable, printable, or otherwise viewable representations of the layer data. For example, one form of the layer data can include a three-dimensional stratigraphic map of a workpiece or portions of a workpiece. Such a map can reveal various types of workpiece and workpiece layer characteristics that include layer curvature, film quality, and/or regions of compressive and tensile forces (i.e., regions of workpiece bowing).

By combining and associating layer thickness and surface height measurements with workpiece coordinates, the metrology tool 10 and the related embodiments can quickly provide a stratigraphic representation that provides both thickness and contour data. Conventional methods of gathering such data generally sacrifice workpiece samples or tend to be time intensive and not carried out by a single high-throughput metrology tool. For example, to obtain layer data using an SEM, a sample may be first cleaved from a workpiece. The SEM can then obtain layer data by scanning the sample; however, the cleaved workpiece is damaged and consequently cannot undergo any further manufacturing steps. In other applications, an SEM can image the top surface without damaging the wafer, but even in these applications the throughput is too low to be implanted in a process flow. Thus, a SEM, by itself, cannot be used to acquire layer data from a workpiece that is in-line with a semiconductor process flow. Alternatively, conventional in-line methods of gathering layer data may not efficiently calculate layer contours because most fabrication facilities use profilometry or atomic force microscopy to measure surface topography. These types of tools are generally relatively slow because they continuously scan or raster across a workpiece surface and produce large volumes of data that subsequently need to be filtered or further processed before individual sampling sites can even be identified. Furthermore, many of these scanning tools also make physical contact with a workpiece.

Figure 2:
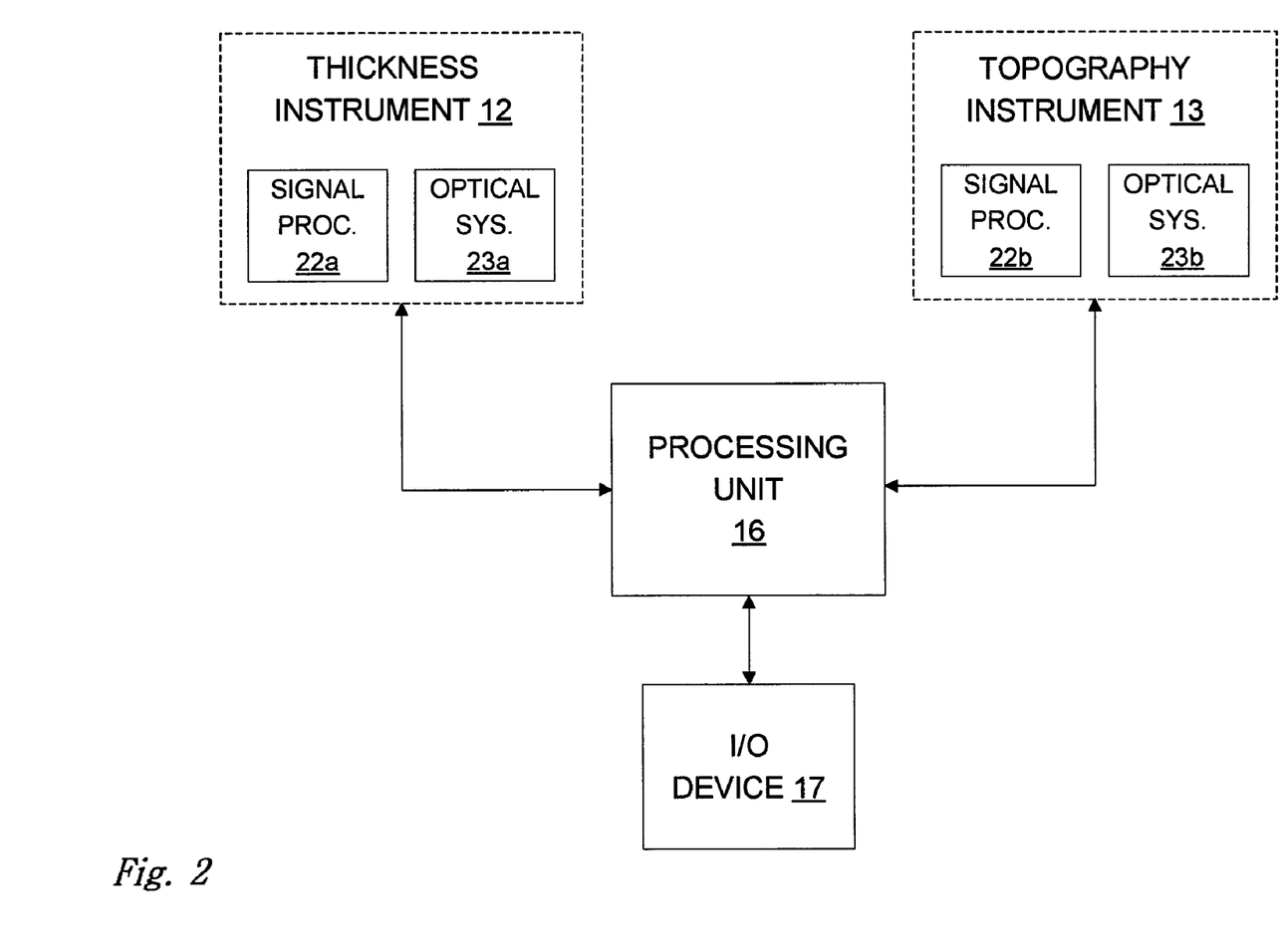
FIG. 2 is a block diagram showing components of the metrology tool of FIG. 1A.

FIG. 2 shows a block diagram of an example of the processing unit 16, the I/O device 17, and the thickness and topography instruments 12-13. The processing unit 16 can be a stand alone computer or other type of computing device that includes a processor, a memory having executable program instructions, and various communication ports for receiving and transmitting data, control signaling, and other types of communication with the thickness and topography instruments 12-13 and the I/O device 17. In general, the processing unit 16 is configured to receive individual layer thickness and surface height measurements taken by the thickness and topography instruments 12-13 at individual sampling sites, combine these individual measurements by mapping them to workpiece coordinates, and, optionally, transmit the combined measurements to the I/O device 17. Additionally, the processing unit 16 can be further configured to coordinate and direct the calibration and the alignment of the thickness and topography instruments 12-13, manage the transport system 18, receive user input from the I/O device 17, and/or maintain databases of pre-programmed recipes and historical layer data. The user input can include, for example, a selected number of sampling sites that are to be measured by the metrology tool 10. The pre-programmed recipes can include a user-configured wafer map that identifies individual sampling sites and individual workpiece layer types (see, e.g., FIG. 3). The historical layer data may include sets of layer data corresponding to individual workpieces that have been previously measured by the metrology tool 10.

Turning again to FIG. 2, the thickness and topography instruments 12-13 include, respectively, signal processing systems 22a-b coupled with corresponding optical systems 23a-b. The signal processing system 22a-b can include a processor, a memory, and other types of circuitry for operating and calibrating the optical systems 23a-b and communicating with the processing unit 16. The optical systems 23a-b can include optical components (e.g., light sources, lenses, mirrors) and mechanical components (e.g., stages, actuators, gearing). The optical components target and recover light at a workpiece surface and the mechanical components align optical components with specific locations within a sampling site on a workpiece surface. In many embodiments, the thickness and topography instruments 12-13 are automated so that upon loading a workpiece into either of the instruments 12-13, the workpiece is automatically measured at sampling sites set up by a user at the I/O device 17 and/or the processing unit 16. Generally speaking, workpiece throughput of the metrology tool 10 depends, at least in part, on the number of sampling sites. Accordingly, the thickness and topography instruments 12-13 can be calibrated to have similar data measurement times and workpiece throughputs to coordinate the flow of workpieces through the metrology tool 10.

In several embodiments, the thickness and topography instruments 12-13 are non-contact tools that use non-destructive measurement techniques which do not exert a force against a sampling site. Thus the thickness instrument 12 may comprise an ellipsometer and the topography instrument 13 may comprise an interferometer. As described above, an ellipsometer generally works by measuring the reflection of light at an individual sampling site and detecting layer thickness by utilizing both the polarization of the light and the phase change of the reflected light. An interferometer, on the other hand, measures topography by detecting interference patterns or phase shifts of reflected light at the sampling site and correlating an amount of interference with a relative surface height measurement. In general, the diameter of an incident light beam is correlative with the smallest workpiece feature size that can be measured. For example, a beam spot diameter of about 25 um can measure workpiece features as small as 2500 um$^2$. In other embodiments, the thickness instrument 12 and/or the topography instrument 13 may include non-optical based measurement instruments, or include combinations of optical and non-optical based measurement instruments. For example, the thickness instrument may include a four-point probe for measuring the thickness of metal workpiece layers and the topography instrument may include an atomic force microscope probe for determining surface roughness of a workpiece layer.

Figure 3:
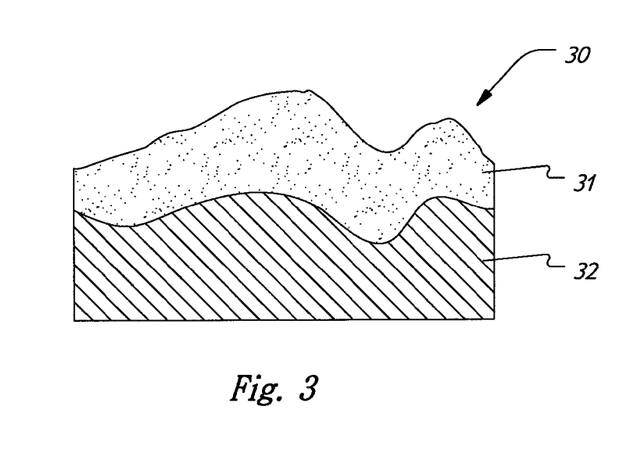
FIG. 3 is a cross-sectional side view of a portion microelectronic workpiece that is measured by the metrology tool of FIG. 1A.

FIGS. 3-5B and the corresponding descriptions illustrate and describe embodiments of the operation of the metrology tool 10 and, more specifically, the production of layer data corresponding to one or more workpiece layers. FIG. 3 is a cross-sectional side view of a portion of a microelectronic workpiece 30 having a first layer 31 located on top of a second layer 32. The first layer 31 can be, for example, a first material such as silicon-dioxide, silicon-nitride, or polysilicon, and the second layer 32 can be an underlying substrate or a second material. In general, the polarization and reflection of incident light will vary with the type of material of the first and second layers 31-32. Thus, the thickness and topography instruments 12-13 may receive calibration data that configures the signal processing systems 22a-b and/or the optical systems 23a-b to measure specific types of material. The calibration data can be input by a user, stored by the processing unit 16, and/or stored at the thickness and topography instruments 12-13.

Figure 4A:
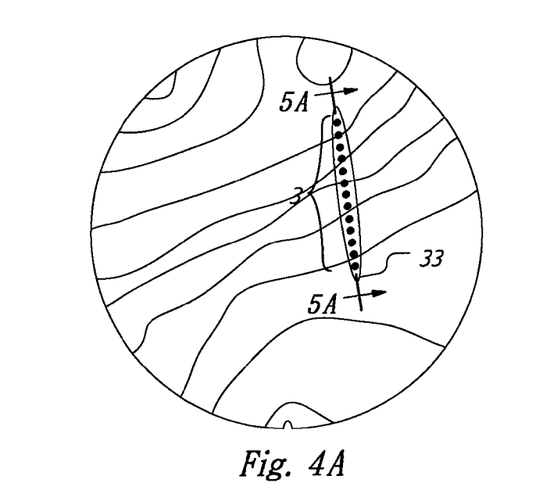
FIG. 4A is a topographical wafer-map showing a top-view of the workpiece of FIG. 3 and corresponding sampling sites.
Figure 4B:
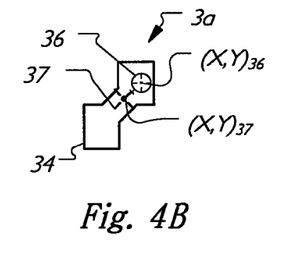
FIGS. 4B-D are blow-up views of a sampling site showing target regions on the workpiece of FIG. 3 and corresponding workpiece coordinates.

FIG. 4A is a topographical wafer map of the workpiece 30 showing a measurement area 33 with individual sampling sites 3 where the thickness instrument 12 measures layer thickness and the topography instrument 13 measures surface topography. The thickness and topography instruments 12-13 should be aligned with respect to one another so that they are generally targeting the same workpiece features or locations within the sampling sites 3. FIG. 4B shows a blow-up view of an individual sampling site 3a that includes a workpiece feature 34 and first and second target regions 36-37 aligned to the workpiece feature 34 at corresponding workpiece coordinates $(X, Y)_{36}$ and $(X, Y)_{37}$. The workpiece feature 34, for example, can comprise microelectronic or micromechanical devices, or portions thereof, such as overlay marks, trenches, bond pads, interconnects, or various other structural and/or electronic components. The first target region 36 comprises a first location that is measured by the thickness instrument 12, which includes, for example, the region where an ellipsometer beam spot is targeted. The second target region 37 comprises a second location that is measured by the topography instrument 13 and may include the region where an interferometer beam spot is targeted. Additionally, although shown as based on Cartesian coordinates, the workpiece coordinates $(X, Y)_{36}$ and $(X, Y)_{37}$ can be based on other types of coordinates systems, such as polar or radial coordinate systems. Further, in several embodiments, the thickness and topography instruments 12-13 and/or the processing unit 16, are configured to recognize surface patterns in the workpiece 30. Such pattern recognition may be used to identify the workpiece feature 34 and sample the workpiece 30 at a known distance from the workpiece feature 34. Also, in other embodiments, the metrology tool 10 uses pattern recognition based on the desired resolution of the layer data (e.g., including pattern recognition for high-resolution layer data and omitting pattern recognition for low-resolution layer data).

Figure 4C:
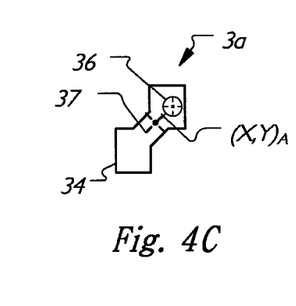
Figure 4D:
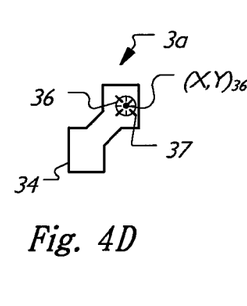

In many embodiments the first and second target regions 36-37 are sited relative to a coordinate at a sampling site that is either approximated (e.g., when the thickness and metrology tools 12-13 are slightly mis-aligned) or aligned with one of the first and second target regions 36-37. FIG. 4C shows an embodiment in which the first and second targets 36-37 are offset from each other about an approximated workpiece coordinate $(X, Y)_A$ calculated by the metrology tool 10. The approximated coordinate $(X, Y)_A$ refers to the general location of the first and second target regions 36-37 and can be calculated, for example, by the processing unit 16 determining a mid-point between the coordinates $(X, Y)_{36}$ and $(X, Y)_{37}$. FIG. 4D illustrates another embodiment in which the first and second target regions 36-37 are aligned on top of one another at the workpiece coordinate $(X, Y)_{36}$. Such an alignment can occur when a workpiece is first transferred into the topography instrument 13 and may be carried out by the processing unit 16 directing the topography instrument 13 to move the target region 37 to the workpiece coordinates $(X, Y)_{36}$. In alternative embodiments, the processing unit 16 can direct the thickness instrument 12 to move the target region 36 to the workpiece coordinate $(X, Y)_{37}$ or direct the thickness and topography instruments 12-13 to workpiece coordinates that have been otherwise obtained or calculated. For example, the processing unit 16 can locate a reference point on the workpiece feature 34 (e.g., a corner, an intersection, or some other distinctive feature), calculate distances between the reference point and the workpiece coordinates $(X, Y)_{36}$ and $(X, Y)_{37}$, and use the calculated distances to fine-tune the location of either of the first and second target regions 36 and 37.

Figure 5A:
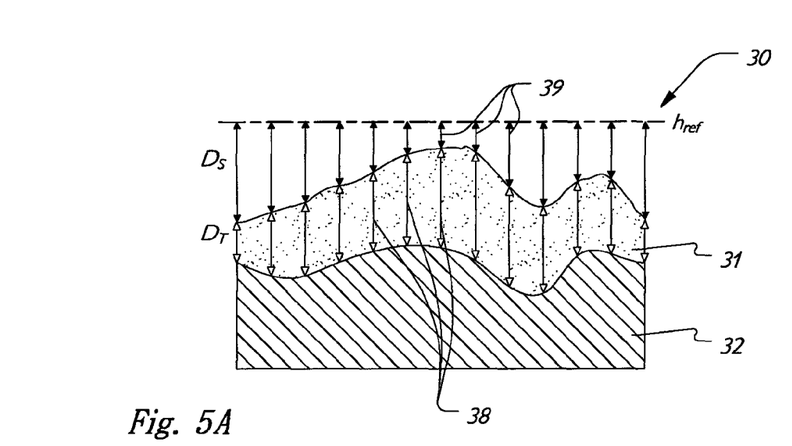
FIG. 5A is a cross-sectional view of FIG. 3 taken along line 5A-5A overlayed with dimension lines corresponding to thickness measurements and surface height measurements.

After associating workpiece coordinates with individual sampling sites, the thickness and surface height measurements reveal height and thickness displacements of the first workpiece layer 31 at discrete locations on the workpiece 30. FIG. 5A is a cross-section of FIG. 2 along line 5A-5A illustrating thickness and surface height measurements 38-39 (drawn as dimension lines) taken, respectively, by the thickness and topography instruments 12-13 at individual sampling sites 3. Individual thickness measurements 38 extend between a top-side surface of the first layer 31 and an interface between the first and second layers 31-32. Individual surface height measurements 39 extend between the top surface of the first layer 31 and a reference height $h_{ref}$. In general, the reference height $h_{ref}$ is an arbitrary reference point, such as the highest or lowest measured surface height (i.e., by the topography instrument 13); however, other values of $h_{ref}$ are possible.

Figure 5B:
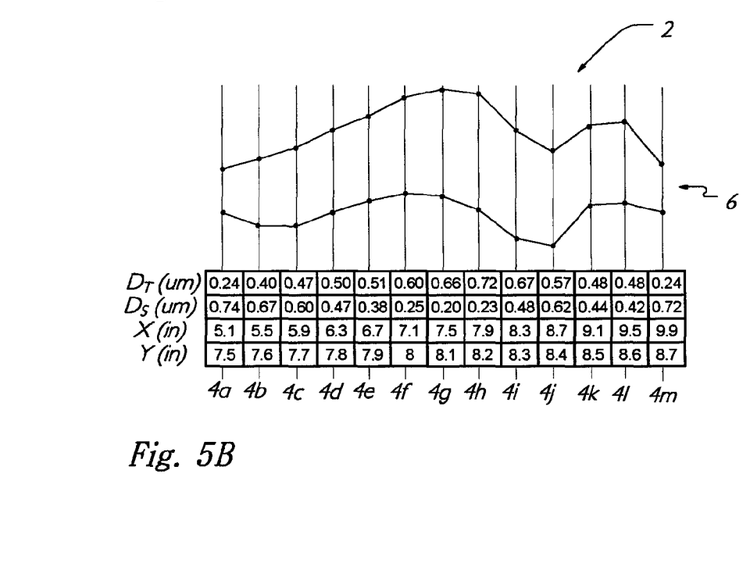
FIG. 5B is a stratigraphic cross-section of the workpiece of FIG. 3 that has been created from individual measurements of thickness and topography at corresponding workpiece coordinates.

FIG. 5B shows the stratigraphic cross-section 2 and the layer strata 6 that has been assembled from individual datums 4a-m of measured thickness $D_T$, measured surface height $D_S$, and individual workpiece coordinates (X, Y). For example, the datum 4a indicates that at workpiece coordinates (5.1, 7.5) the first layer 31 has a thickness of 0.24 um and a relative surface height of 0.74 um. The datum 4b indicates that at neighboring coordinates (5.5, 7.6) the first layer 31 has a thickness of 0.40 um and a relative surface height of 0.67 um. Accordingly, the datums 4a-b define a first portion of the layer strata 6, and the datums 4c-m can be used to define the remainder of the layer strata 6. As shown, the layer strata 6 generally resembles the actual cross-sections of the workpiece 30 shown in FIGS. 2 and 5A, and it has a resolution that is determined by the number of individual datums within the measurement area 33 (FIG. 4A). Adding more datums to the measurement area 33 increases the resolution of the layer strata 6, but it may also increase workpiece throughput time. Therefore, in other embodiments, the metrology tool 10 may be configured to produce fewer datums for higher throughput or more datums for greater detailed analysis.

Figure 6:
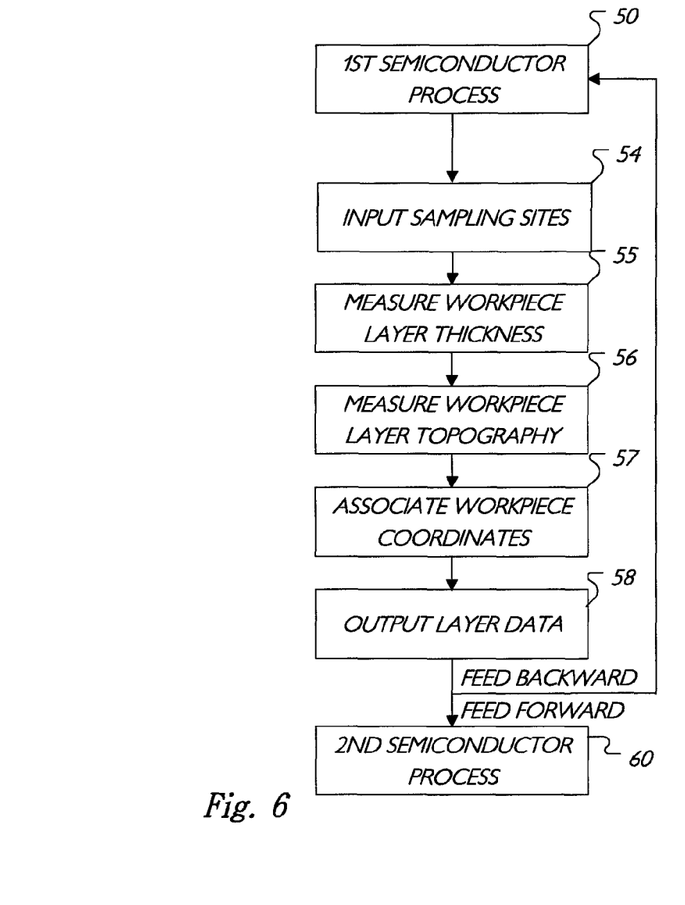
FIG. 6 is a flow diagram showing operation of the metrology tool in a semiconductor process flow.

FIG. 6 is a flow diagram showing an embodiment of a semiconductor process flow that uses the metrology tool 10 during the manufacturing of a microelectronic workpiece. The process flow includes first and second semiconductor processes (blocks 50 and 60) corresponding to processes for manipulating materials on a substrate and an embodiment of a process for characterizing the thickness and topography of layers on a workpiece corresponding to measurements and processes carried out by the metrology tool 10. The first and second semiconductor processes 50 and 60 can include deposition, patterning, etching, planarizing, and other processes. After the first semiconductor process 50, the metrology tool 10 receives input sample sites (block 54) from the processing unit 16, the I/O device 17, and/or another source. The thickness and topography instruments measure layer thickness and surface topography (blocks 55 and 56). The metrology tool 10 associates the thickness and surface height measurements with workpiece coordinates (block 57) and outputs layer data (block 58) that can be fed backward to the first semiconductor process 50 and/or fed forward to the second semiconductor process 60.

In one embodiment, the first semiconductor process 50 can be a silicon oxide chemical-and-mechanical-polishing (CMP) process and the second process can be a silicon oxide etching process 60. The layer data that is fed backward can provide the CMP process control information by highlighting oxide layer regions that have been under- or over-planarized. The layer data that is fed forward can provide the etching process data to accurately adjust an etch time to accommodate the under- or over-planarization of the oxide layer. In several related embodiments, a quick scan of the oxide layer may be performed by limiting the number of sampling sites and/or by approximating workpiece coordinates at the sampling sites. On the other hand, a more detailed analysis of the oxide layer can be performed by measuring a larger number of sampling sites and/or by using aligned workpiece coordinates at the sampling sites.

Figure 7A:
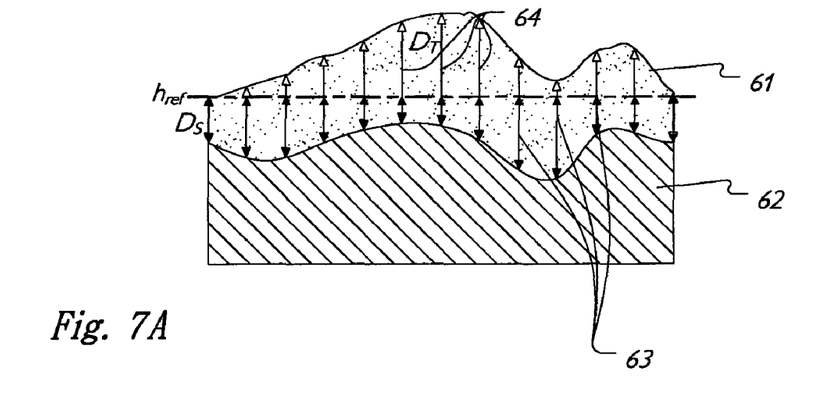
FIGS. 7A and 7B are cross-sectional side views of portions of microelectronic workpiece layers overlayed with dimensions lines corresponding to thickness measurements and surface height measurements.
Figure 7B:
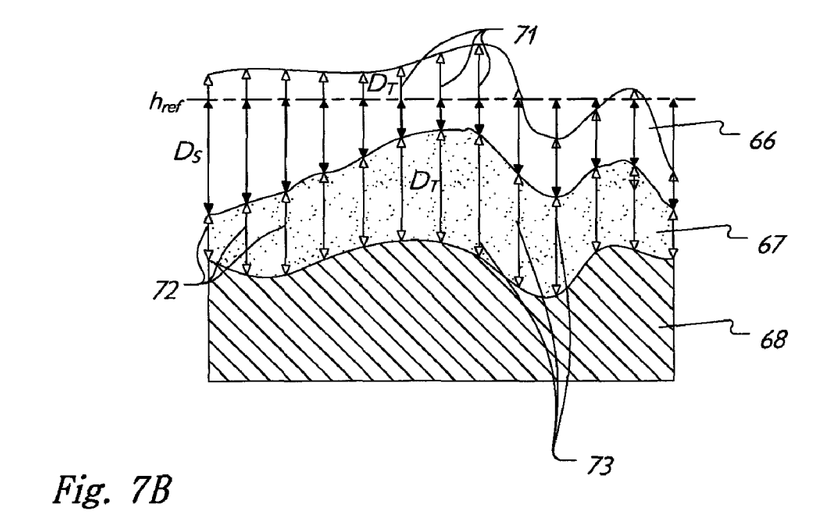

FIGS. 7A and 7B are cross-sectional diagrams for illustrating additional or alternative methods for using the metrology tool 10 to measure and collect layer data. FIG. 7A shows first and second workpiece layers 61-62, surface height measurements 63 extending between a bottom-side surface of the second workpiece layer 62 and a reference height, and thickness measurements 64 extending between a top surface of the first workpiece layer 61 and an interface between the first and second workpiece layers 61-62. In this embodiment, the surface height measurements 63 are taken before forming the first layer 61 and stored by the metrology tool 10 for later use. For example, after forming the first layer 61 and obtaining the thickness measurements 64, the metrology tool 10 can assemble a stratigraphic cross-section by recalling the surface height measurements 63 and combining them with the thickness measurements 64. In another embodiment, FIG. 7B shows a stack of workpiece layers 66-68, first and second surface height measurements 71-72 extending between the stacked layers 66-68, and surface height measurements 73 extending between a top surface of the layer 67 and a reference height. Such an embodiment may be carried out by the metrology tool 10 by storing and recalling sets of measured layer data as needed, and iteratively combining the measured layer data to create a stratigraphic cross-section that includes two or more layer strata.

Figure 8:
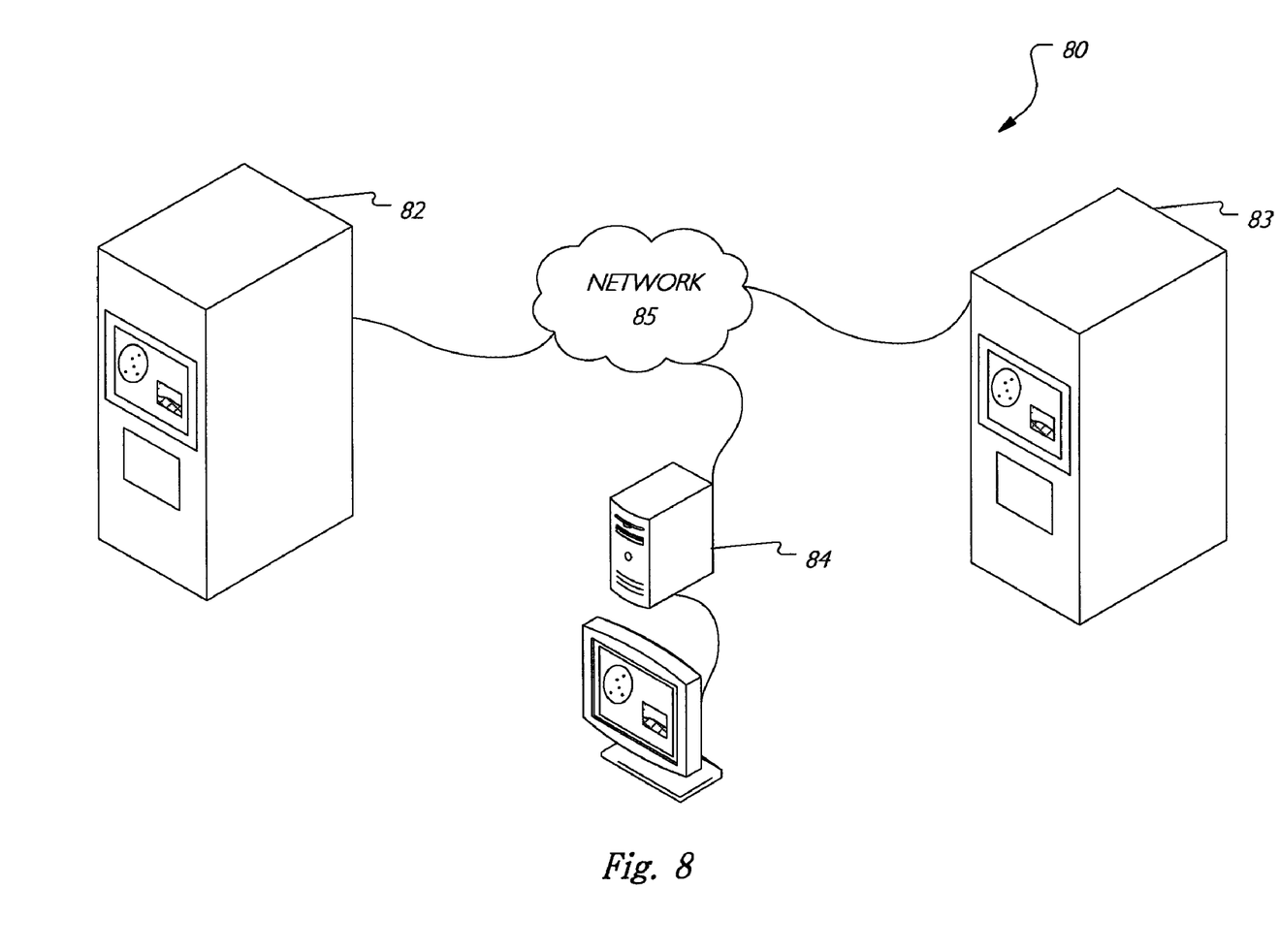
FIG. 8 is an isometric view of a metrology system configured in accordance with an alternative embodiment of the disclosure.

In an alternative embodiment, FIG. 8 shows an isometric view of a metrology system 80 that includes separately located thickness and topography instruments 82-83 operatively coupled with a processing unit 84 (e.g., a computer) over a local network 85. In this embodiment, the system 80 can be distributed across several portions of a semiconductor manufacturing facility. For example, the thickness instrument 82 may be located near layer deposition equipment, the topography instrument 83 may be found near etching equipment, and the processing unit 84 can be a personal computer that is outside of a production area.

From the foregoing, it will be appreciated that specific embodiments have been described herein for purposes of illustration, but well-known structures and functions have not been shown or described in detail to avoid unnecessarily obscuring the description of the embodiments. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration but that various modifications may be made within the claimed subject matter. For example, many of the elements of one embodiment can be combined with other embodiments in addition to, or in lieu of, the elements of the other embodiments. Accordingly, the invention is not limited except as by the appended claims.

We claim:

1. A system for producing layer data that characterizes one or more layers of a microelectronic workpiece, comprising:
   a layer thickness instrument configured to measure a thickness of a first workpiece layer at individual sampling sites;
   a surface topography instrument configured to measure a relative surface height of the first layer at the individual sampling sites; and
   a processing unit operatively coupled to thickness and topography instruments to receive thickness and topography measurements, wherein the processing unit outputs layer data that includes individual thickness measurements combined with individual topography measurements at workpiece coordinates corresponding to the individual sampling sites.

2. The system of claim 1, further comprising an output device communicatively coupled with the processing unit, wherein the output device graphically displays a stratigraphic cross-section corresponding to the output layer data.

3. The system of claim 2 wherein the output device is configured to graphically display a wafer map that relates the individual sampling sites with the stratigraphic cross-section.

4. The system of claim 1, further comprising an input device operably coupled with the processing unit and configured to receive a user-configured wafer map that identifies the individual sampling sites.

5. The system of claim 1, further comprising a wafer transport system operably coupled with the thickness and topography instruments and configured to transport microelectronic workpieces to and from the thickness and topography instruments.

6. The system of claim 1, further comprising a housing, wherein the thickness and topography instruments and the processing unit are disposed within the housing.

7. The system of claim 1 wherein the processing unit is coupled to the thickness and topography instruments through a local network.

8. A computing device, comprising:
a processor configured to receive thickness measurements of a microelectronic workpiece layer at individual sampling sites and topography measurements of the workpiece layer at the individual sampling sites; and
a memory comprising program instructions that are executable by the processor to map the individual thickness and topography measurements to individual workpiece coordinates.

9. The computing device of claim 8 wherein the processor includes a communication port that is coupled to a thickness instrument or a topography instrument.

10. The computing device of claim 9 wherein:
the processor is coupled to an optical system having a layer thickness instrument configured to measure a thickness of a workpiece layer at the individual sampling sites and a surface topography instrument configured to measure a relative surface height of the workpiece layer at the individual sampling sites;
the program instructions are further executable by the processor to coordinate alignment of the optical system such that the layer thickness instrument and the surface topography instrument are generally targeting the same locations within the sampling sites.

11. The computing device of claim 8 wherein the program instructions are further executable by the processor to approximate the individual workpiece coordinates by calculating a midpoint between workpiece coordinates associated with the individual thickness measurements and workpiece coordinates associated with the individual topography measurements.

12. A metrology tool, comprising:
a housing having an opening that is arranged to receive a microelectronic workpiece having a first layer;
an ellipsometer disposed within the housing and operably coupled with a processing unit, wherein the ellipsometer is configured to transmit thickness measurements of the first layer to the processing unit; and
an interferometer disposed within the housing and operably coupled with the processing unit, wherein the interferometer is configured to transmit topography measurements of the first layer to the processing unit.

13. The metrology tool of claim 12 wherein the processing unit is configured to output layer data that includes the individual thickness measurements, the individual topography measurements, and workpiece coordinates associated with the individual thickness and topography measurements.

14. The metrology tool of claim 12, further comprising at least one of a four-point probe and an atomic force microscope disposed within the housing and operably coupled with the processing unit.

15. A method for characterizing microelectronic workpiece layers, the method comprising:
collecting individual first datums of thickness, surface height, and workpiece coordinates corresponding to a first microelectronic workpiece layer using a thickness instrument, a topography instrument, and a computing device operably coupled with the thickness and topography instruments; and
producing a stratigraphic representation of the first workpiece layer based on the individual first datums using the computing device.

16. The method of claim 15, further comprising outputting the stratigraphic representation to at least one of graphical display and a printer.

17. The method of claim 15 wherein the first workpiece layer is a top-most layer of a microelectronic workpiece.

18. The method of claim 15 wherein the computing device coordinates the collecting of the individual first datums by a measurement process that includes:
directing the thickness instrument to measure a thickness of the workpiece layer at individual sampling sites;
directing the topography instrument to measure a relative surface height of the workpiece layer at the individual sampling sites; and
associating the individual sampling sites with individual workpiece coordinates.

19. The method of claim 18 wherein the relative surface height measurements are measured between a top-side surface of the workpiece layer and a reference height.

20. The method of claim 18 wherein the relative surface height measurements are measured between a bottom-side of the workpiece layer and a reference height.

21. The method of claim 18 wherein the measurement process is configured to store the relative surface heights of the workpiece layer prior to formation of the workpiece layer.

22. The method of claim 18 wherein associating the individual sampling sites with the individual workpiece coordinates includes approximating the individual workpiece coordinates.

23. The method of claim 15, further comprising:
collecting individual second datums of thickness, surface height, and workpiece coordinates corresponding to a second microelectronic workpiece layer using the thickness instrument, the topography instrument, and the computing device; and
producing the stratigraphic representation further based on the individual second datums using the computing device.

24. A method for providing layer data corresponding to a microelectronic workpiece layer, the method comprising:
measuring a microelectronic workpiece layer with a thickness instrument at individual sampling sites;
measuring the workpiece layer with a surface topography instrument at the individual sampling sites; and
communicating thickness and topography measurements to a processing unit that is configured to create layer data by a process that includes combining individual thickness measurements with individual surface height measurements at workpiece coordinates corresponding to the individual sampling sites.

25. The method of claim 24, further comprising using the layer data to adjust at least one semiconductor process.

26. The method of claim 24, further comprising using the layer data as a process control for at least one semiconductor process.

* * * * *